United States Patent
Liao et al.

(10) Patent No.: US 9,317,137 B2
(45) Date of Patent: Apr. 19, 2016

(54) OPTICAL TOUCH DETECTION MODULE, PROJECTION SYSTEM WITH OPTICAL TOUCH DETECTION MODULE, AND METHOD OF OPTICAL TOUCH DETECTION MODULE

(71) Applicants: Chien-Chung Liao, Hsin-Chu (TW); Yao-Shun Lin, Hsin-Chu (TW)

(72) Inventors: Chien-Chung Liao, Hsin-Chu (TW); Yao-Shun Lin, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 73 days.

(21) Appl. No.: 14/311,365

(22) Filed: Jun. 23, 2014

(65) Prior Publication Data
US 2015/0022733 A1 Jan. 22, 2015

(30) Foreign Application Priority Data
Jul. 19, 2013 (CN) .......................... 2013 1 0306477

(51) Int. Cl.
G06F 3/03 (2006.01)
G06F 3/042 (2006.01)

(52) U.S. Cl.
CPC ............ *G06F 3/0325* (2013.01); *G06F 3/0423* (2013.01)

(58) Field of Classification Search
CPC .... G06F 3/042–3/0428; G06F 3/0304–3/0325
USPC ......................................................... 345/175
See application file for complete search history.

(56) References Cited

U.S. PATENT DOCUMENTS

| | | | |
|---|---|---|---|
| 5,525,764 A | 6/1996 | Junkins et al. | |
| 8,723,837 B1 * | 5/2014 | Fu ........................ | G06F 3/0423 178/18.09 |
| 2009/0058833 A1 * | 3/2009 | Newton ............... | G06F 3/0421 345/175 |
| 2010/0207876 A1 | 8/2010 | Lin | |
| 2010/0245264 A1 * | 9/2010 | Wu ....................... | G06F 3/0423 345/173 |
| 2010/0245292 A1 * | 9/2010 | Wu ....................... | G06F 3/0423 345/175 |
| 2012/0212441 A1 * | 8/2012 | Christiansson ....... | G06F 3/0416 345/173 |

FOREIGN PATENT DOCUMENTS

CN 102184060 9/2011

\* cited by examiner

*Primary Examiner* — Larry Sternbane
(74) *Attorney, Agent, or Firm* — Jianq Chyun IP Office

(57) ABSTRACT

A touch module, a projection system, and a touch method of the touch module are provided. The touch module includes a laser scanner device, a photodiode, an image capturing device, and a processing unit. The laser scanner device sequentially provides a touch region with a laser beam at a plurality of angles in a first period. The photodiode is configured for receiving a reflection beam from a touch point in the touch region. The image capturing device captures an image having another reflection beam from the touch point in a second period. The processing unit determines a first angle corresponding to the touch point according to the reflection beam from the touch point received by the photodiode, determines a second angle corresponding to another reflection beam captured by the image capturing device, and calculates location information of the touch point according to the first angle and the corresponding second angle.

28 Claims, 7 Drawing Sheets

OPTICAL TOUCH DETECTION MODULE, PROJECTION SYSTEM WITH OPTICAL TOUCH DETECTION MODULE, AND METHOD OF OPTICAL TOUCH DETECTION MODULE

CROSS-REFERENCE TO RELATED APPLICATION

This application claims the priority benefit of China application serial no. 201310306477.8, filed on Jul. 19, 2013. The entirety of the above-mentioned patent application is hereby incorporated by reference herein and made a part of this specification.

BACKGROUND OF THE INVENTION

1. Field of the Invention

The invention relates to a projection system, a touch module, and a touch method of the touch module. More particularly, the invention relates to a projection system, a touch module, and a touch method of the touch module using a laser beam.

2. Description of Related Art

In recent years, as information technology, wireless mobile communication, and information appliances have been rapidly developed and applied, various information products have utilized touch modules as input devices in replacement of conventional input devices, such as keyboards or mice, so as to ensure the convenience, the compactness, and the user-friendly design of the information products. The touch module can be generally categorized into a resistive touch module, a capacitive touch module, an optical touch module, a sound wave touch module, an electromagnetic touch module, etc, and the touch mechanism of the optical touch module is adapted to a large-sized display panel. The increasing size of the existing display panel contributes to the popularity of the optical touch module.

In general, the optical touch module senses the location of a touch point by two image sensors at different corners of the touch region, and thus one single touch point is detected in a normal manner. However, if there are multiple (i.e., two or more) touch points in the touch region, a ghost point issue arises, which leads to inoperability of or erroneous detection by the optical touch module. If it is intended to resolve the ghost point issue or achieve the multi-touch function, the quantity of the image sensors is increased. The increase in the quantity of the image sensors, however, often increases the hardware costs and raises the operation complexity of touch points. Besides, the maximum number of image sensors is subject to the volume and the structure of the touch module. Hence, how to achieve the multi-touch function under the conventional limitations of the volume and the structure of the touch module has to be taken into consideration in process of designing the optical touch module.

U.S. Pat. No. 5,525,764 discloses an image processing system with a handwriting input function and a method of manufacturing the image processing system. In the system, handwritten data are transmitted to a microprocessor which marks the handwriting locations on an image by certain colors according to the coordinates of the handwriting locations and the width of the handwriting locations, so as to create a new image combining the handwritten data and the original image.

U.S. Patent Application Publication no. 20100207876 discloses a laser scanner input device that includes a horizontal laser scanner device, an image capturing device, and a microprocessor. In the laser scanner input device, a laser beam is applied to horizontally scan an object, and the image capturing device is applied to capture an image reflected by the object. The laser scanner input device further calculates and obtains the coordinate of the object by the microprocessor, and the calculated coordinate serves as the corresponding input data.

China Patent Publication no. 102184060 discloses an optical touch device in which retro-reflectors are configured at three edges of a baseplate of a touch member, and an infrared laser head and a brightness sensor are located at two top corners on the other edge. A reflection mirror that scans the entire display region is configured on a rotatable mechanical device. A laser beam is blocked and reflected to the brightness sensor if a touch object is in the display region. According to the brightness information received by the brightness sensor and the brightness information fed back by the rotatable mechanical device, it can be determined whether there exists an object on the display region.

SUMMARY OF THE INVENTION

The invention is directed to a touch module, a projection system having the touch module, and a touch method of the touch module, so as to perform a multi-touch function without increasing hardware costs of the touch module and resolve a ghost point issue which may occur when the multi-touch function is performed.

Additional aspects and/or advantages of the invention will be set forth in part in the description which follows and, in part, will be obvious from the description, or may be learned by practice of the invention.

An embodiment of the invention provides a touch module that includes a laser scanner device, a photodiode, an image capturing device, and a processing unit. The laser scanner device sequentially provides a touch region with a laser beam at a plurality of angles in a first period. The photodiode is configured for receiving a reflection beam from a touch point in the touch region. The image capturing device captures an image having another reflection beam from the touch point in a second period. The processing unit is electrically connected to the laser scanner device, the photodiode, and the image capturing device. Here, the processing unit determines a first angle corresponding to the touch point according to the reflection beam from the touch point received by the photodiode, determines a second angle corresponding to the another reflection beam captured by the image capturing device, and calculates location information of the touch point according to the first angle and the corresponding second angle.

According to an embodiment of the invention, in the second period, the laser scanner device provides the touch region with the laser beam corresponding to the first angle.

According to an embodiment of the invention, when the touch region has a plurality of touch points, the laser scanner device provides the touch region with the laser beam corresponding to one of a plurality of first angles respectively in a plurality of sub-periods of the second period, and the processing unit calculates the location information of the touch points according to the first angles corresponding to the sub-periods and a plurality of second angles captured by the image capturing device in the sub-periods.

According to an embodiment of the invention, when the touch region has a plurality of touch points, the laser scanner device provides the touch region with the laser beam corresponding to a portion of a plurality of first angles respectively in a plurality of sub-periods of the second period, the processing unit determines the second angles corresponding to the first angles according to the partial first angles in the sub-periods and the second angles captured by the image capturing device in the sub-periods, so as to calculate the location information of each of the touch points, and the partial first angles corresponding to the sub-periods are partially repeated. Here, the number of a plurality of the captured images captured in the sub-periods is N, the number of the touch points is $2^N-1$, N is a positive integer, and N is greater than or equal to 2.

According to an embodiment of the invention, when the touch region has a plurality of touch points, the laser scanner device sequentially provides the touch region with the laser beam corresponding to a plurality of first angles and corresponding to the same irradiation brightness in a first sub-period of the second period and sequentially provides the touch region with the laser beam corresponding to the first angles and corresponding to different irradiation brightness in a second sub-period of the second period, and the processing unit determines the second angles corresponding to the first angles according to variations in the irradiation brightness corresponding to the first angles in the first sub-period and the second sub-period and variations in the irradiation brightness corresponding to the second angles obtained by the image capturing device in the first sub-period and the second sub-period, so as to calculate the location information of the touch points. Here, the first angles in the first sub-period correspond to the same number of irradiation times of the laser beam, and the first angles in the second sub-period correspond to different irradiation times of the laser beam. Alternatively, the first angles in the first sub-period correspond to identical irradiation power of the laser beam, and the first angles in the second sub-period correspond to different irradiation power of the laser beam.

According to an embodiment of the invention, the processing unit determines that the second angle corresponds to the first angle according to the variation in the irradiation brightness corresponding to the first angle being identical to the variation in the irradiation brightness corresponding to the second angles obtained by the image capturing device.

An embodiment of the invention provides a projection system that includes a projection screen, a projection device, and the aforesaid touch module. The projection device is configured for projecting an image to the projection screen. The touch module is located on the projection screen. The touch module includes: a laser scanner device sequentially providing a projection region on the projection screen with a laser beam at a plurality of angles in a first period; a photodiode configured for receiving a first reflection beam from a touch point in the projection region, wherein the laser beam irradiates the touch point to result in reflection to generate the first reflection beam; an image capturing device capturing an image having a second reflection beam from the touch point in a second period, wherein the laser beam irradiates the touch point to result in reflection to generate the second reflection beam; a processing unit electrically connected to the laser scanner device, the photodiode, and the image capturing device. The processing unit determines a first angle corresponding to the touch point according to the first reflection beam from the touch point received by the photodiode, determines a second angle corresponding to the second reflection beam according to the image having the second reflection beam captured by the image capturing device, and calculates location information of the touch point according to the first angle and the corresponding second angle.

According to an embodiment of the invention, in the second period, the laser scanner device sequentially provides the projection region with the laser beam corresponding to the first angle. When the projection region has a plurality of touch points, the laser scanner device provides the projection region with the laser beam corresponding to one of a plurality of first angles respectively in a plurality of sub-periods of the second period, and the processing unit calculates the location information of the touch points according to the first angles corresponding to the sub-periods and a plurality of second angles obtained by the image capturing device in the sub-periods.

According to an embodiment of the invention, when the projection region has a plurality of touch points, the laser scanner device provides the projection region with the laser beam corresponding to a portion of a plurality of first angles respectively in a plurality of sub-periods of the second period, the processing unit determines the second angles corresponding to the first angles according to the partial first angles in the sub-periods and a plurality of second angles captured by the image capturing device in the sub-periods, so as to calculate the location information of each of the touch points, and the partial first angles corresponding to the sub-periods are partially repeated. Here, the number of a plurality of the captured images captured in the sub-periods is N, the number of the touch points is $2^N-1$, N is a positive integer, and N is greater than or equal to 2.

According to an embodiment of the invention, when the projection region has a plurality of touch points, the laser scanner device sequentially provides the projection region with the laser beam corresponding to a plurality of first angles and corresponding to the same irradiation brightness in a first sub-period of the second period and sequentially provides the projection region with the laser beam corresponding to the first angles and corresponding to different irradiation brightness in a second sub-period of the second period, and the processing unit determines the second angles corresponding to the first angles according to variations in the irradiation brightness corresponding to the first angles in the first sub-period and the second sub-period and variations in the irradiation brightness corresponding to the second angles obtained by the image capturing device in the first sub-period and the second sub-period, so as to calculate the location information of the touch points. Here, the first angles in the first sub-period correspond to the same number of irradiation times of the laser beam, and the first angles in the second sub-period correspond to different irradiation times of the laser beam.

According to another embodiment of the invention, the first angles in the first sub-period correspond to identical irradiation power of the laser beam, and the first angles in the second sub-period correspond to different irradiation power of the laser beam.

According to an embodiment of the invention, the processing unit determines that the second angle corresponds to the first angle according to the variation in the irradiation brightness corresponding to the first angle being identical to the variation in the irradiation brightness corresponding to the second angles captured by the image capturing device.

An embodiment of the invention provides a touch method of a touch module, and the touch method includes following steps. A touch region is sequentially provided with a laser beam at a plurality of angles in a first period by a laser scanner device. A first reflection beam from a touch point in the touch region is received by a photodiode, and the laser beam irradiates the touch point to result in reflection to generate the first reflection beam. An image having a second reflection beam from the touch point is captured in a second period by an image capturing device, and the laser beam irradiates the touch point to result in reflection to generate the second reflection beam. A first angle corresponding to the touch point is determined by a processing unit according to the first reflection beam from the touch point received by the photodiode, a second angle corresponding to the second reflection beam is determined by the processing unit according to the image having the second reflection beam captured by the image capturing device, and location information of the touch point is calculated by the processing unit according to the first angle and the corresponding second angle.

According to an embodiment of the invention, in the second period, the touch region is sequentially provided with the laser beam corresponding to the first angle by the laser scanner device.

According to an embodiment of the invention, the touch method further includes: when the touch region has a plurality of touch points, providing the touch region with the laser beam corresponding to one of a plurality of first angles by the laser scanner device respectively in a plurality of sub-periods of the second period; calculating the location information of the touch points according to the first angles corresponding to the sub-periods and a plurality of second angles obtained by the image capturing device in the sub-periods.

According to an embodiment of the invention, the touch method further includes: when the touch region has a plurality of touch points, providing the touch region with the laser beams corresponding to a portion of a plurality of first angles by the laser scanner device respectively in a plurality of sub-periods of the second period; determining the second angles corresponding to the first angles according to the partial first angles in the sub-periods and the second angles captured by the image capturing device in the sub-periods, so as to calculate the location information of the touch points, wherein the partial first angles corresponding to the sub-periods are partially repeated. Here, the number of a plurality of the captured images captured in the sub-periods is N, the number of the touch points is $2^N-1$, N is a positive integer, and N is greater than or equal to 2.

According to an embodiment of the invention, the touch method further includes: when the touch region has a plurality of touch points, sequentially providing the touch region with the laser beam corresponding to a plurality of first angles and corresponding to the same irradiation brightness by the laser scanner device in a first sub-period of the second period; sequentially providing the touch region with the laser beam corresponding to the first angles and corresponding to different irradiation brightness by the laser scanner device in a second sub-period of the second period; determining the second angles corresponding to the first angles according to variations in the irradiation brightness corresponding to the first angles in the first sub-period and the second sub-period and variations in the irradiation brightness corresponding to the second angles obtained by the image capturing device in the first sub-period and the second sub-period, so as to calculate the location information of the touch points. Here, the first angles in the first sub-period correspond to the same number of irradiation times of the laser beam, and the first angles in the second sub-period correspond to different irradiation times of the laser beam.

According to an embodiment of the invention the first angles in the first sub-period correspond to identical irradiation power of the laser beam, and the first angles in the second sub-period correspond to different irradiation power of the laser beam.

According to an embodiment of the invention, the step of determining the second angles corresponding to the first angles includes: the second angle is determined as corresponding to the first angle according to the variation in the irradiation brightness corresponding to the first angle being identical to the variation in the irradiation brightness corresponding to the second angles obtained by the image capturing device.

According to an embodiment of the invention, the touch method further includes: when the touch region has the touch point, providing the touch region with the laser beam corresponding to the first angle by the laser scanner device in the second period; calculating the location information of the touch point according to the first angle and the second angle obtained by the image capturing device in the second period.

As discussed above, in the touch module, the projection system having the touch module, and the touch method of the touch module in the embodiment of the invention described above, the photodiode is employed to detect the first angles corresponding to the touch points in the first period, and in the second period the irradiation states corresponding to touch points by the laser beam from the laser scanner device are different. Thereby, the multi-touch function may be performed without increasing the hardware costs of the touch module.

Other features and advantages of the invention will be further understood from the further technological features disclosed by the embodiments of the invention wherein there are shown and described embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
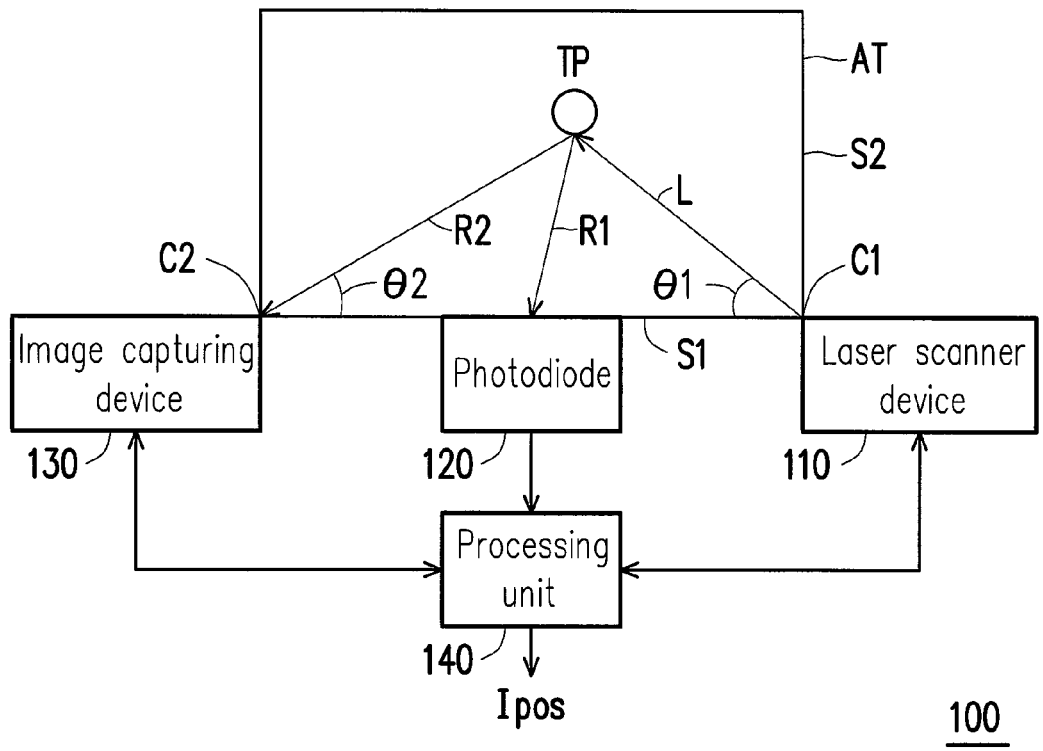
FIG. 1 is a systematic diagram schematically illustrating a touch module according to an embodiment of the invention.

With reference to FIG. 1, in the embodiment, the touch module 100 includes a laser scanner device 110, a photodiode 120, an image capturing device 130, and a processing unit 140. The laser scanner device 110 is located at a corner C1 of a touch region AT. In the embodiment, the corner C1 is the lower-right corner of the touch region AT, as shown in FIG. 1. The photodiode 120 is located on a side S1 of a touch region AT. In the embodiment, the side C1 is the lower side of the touch region AT, as shown in FIG. 1. The image capturing device 130 is located at a corner C2 of the touch region AT. In the embodiment, the corner C2 is the lower-left corner of the touch region AT, as shown in FIG. 1. The processing unit 140 is coupled to the laser scanner device 110, the photodiode 120, and the image capturing device 130. The aforesaid locations of the laser scanner device 110, the photodiode 120, and the image capturing device 130 are merely illustrative but not restrictive in the embodiment of the invention. That is, the laser scanner device 110 and the image capturing device 130 may be respectively located at any two corners of the touch region AT, and the photodiode 120 may be located on one side of the touch region AT.

The laser scanner device 110 is controlled by the processing unit 140; in a first period, the laser scanner device 110 sequentially provides a laser beam L at different angles to scan the entire touch region AT. It is assumed that an angle parallel to the side S1 is 0 degree, and an angle parallel to the side S2 is 90 degrees; the laser scanner device 110 may sequentially provide the laser beam L at angles from 0 degree to 90 degrees, and the laser beam L enters the touch region AT from the corner C1. The photodiode 120 is configured for receiving a reflection beam R1 generated by a touch point (e.g., the touch point TP) in the touch region AT reflecting the laser beam L. That is, when an object is in contact with the touch region AT at the touch point (e.g., TP), the photodiode 120 receives the reflection beam R1 from the touch point (e.g., TP) and then transmits a signal of the received reflection beam R1 to the processing unit 140. The processing unit 140 records the angle (e.g., $\theta 1$) of the laser beam L emitted by the laser scanner device 110, that is, a first angle corresponding to the touch point (e.g., TP). Afterwards, the image capturing device 130 is controlled by the processing unit 140 and captures a corresponding image of the touch region AT from the corner C2 in a second period. In the embodiment, the corresponding image is an image having a reflection beam R2 from the touch point (e.g., TP). The processing unit 140 calculates a second angle (e.g., $\theta 2$) corresponding to the touch point (e.g., TP) in the touch region AT according to the reflection beam R2 captured by the image capturing device 130. According to the embodiment, the first period is a time frame during which the laser beam L is sequentially emitted at angles from 0 degree to 90 degrees, and the second period is a time frame during which the laser beam L is sequentially emitted at angles from 90 degrees to 0 degree. In the second period, the laser scanner device 110 provides the laser beam L at the first angle, and the image capturing device 130 is simultaneously actuated to capture the image; in other periods, the laser scanner device 110 is in an off state to be able to reduce unnecessary power consumption.

In light of the above, the processing unit 140 may determine the first angle (e.g., $\theta 1$) corresponding to the touch point (e.g., TP) according to the timing of the reflection beam R1 from the touch point (e.g., TP) received by the photodiode 120; and calculate the location information Ipos of the touch point (e.g., TP) according to the second angle (e.g., $\theta 2$) corresponding to the reflection beam R2 captured by the image capturing device 130 and then according to the first angle (e.g., $\theta 1$) and the corresponding second angle (e.g., $\theta 2$).

In the embodiment, the touch region AT is assumed to have single touch (i.e., a single touch point TP). During the first period, the processing unit 140 may control the laser scanner device 110 to sequentially provide the laser beam L at angles from 0 degree to 90 degrees, i.e., the touch region AT is scanned at least once, for instance, it may be scanned from the side S1 of the touch region AT to the other side S2 of the touch region AT. Alternatively, the processing unit 140 may control the laser scanner device 110 to sequentially provide the laser beam L at angles from 0 degree to 90 degrees and from 90 degrees to 0 degree, i.e., the touch region AT is scanned back and forth at least once, for instance, it may be scanned from the side S1 to the other side S2 of the touch region AT and then from the side S2 to the other side S1 of the touch region AT. When the laser scanner device 110 provides the laser beam L at the angle $\theta 1$, the photodiode 120 receives the reflection beam R1 from the touch point TP, and the processing unit 140 considers the angle $\theta 1$ as the first angle corresponding to the touch point (e.g., TP).

During the second period, the processing unit 140 controls the image capturing device 130 to capture a corresponding image of the touch region AT from the corner C2, so as to determine the second angle $\theta 2$ corresponding to the touch point TP in the touch region AT according to the reflection beam R2 in the captured image. When the brightness of ambient light is bright enough, the second angle $\theta 2$ corresponding to the touch point TP may be accurately determined according to the image captured by the image capturing device 130, and therefore the laser scanner device 110 may be resulted in the off state. When the processing unit 140 obtains the first angle $\theta 1$ and the second angle $\theta 2$ corresponding to the touch point TP, the processing unit 140 may, according to the first angle $\theta 1$ and the second angle $\theta 2$, calculate the coordinate of the touch point TP through triangulation and provide the location information Ipos corresponding to the touch point TP.

Besides, during the second period, the laser scanner device 110 may sequentially provide the touch region AT with the laser beam L at each first angle (e.g., the angle $\theta 1$), so as to enhance the brightness of the corresponding touch point TP in the image; thereby, the processing unit 140 is able to exactly determine the location of the touch point TP.

Figure 2:
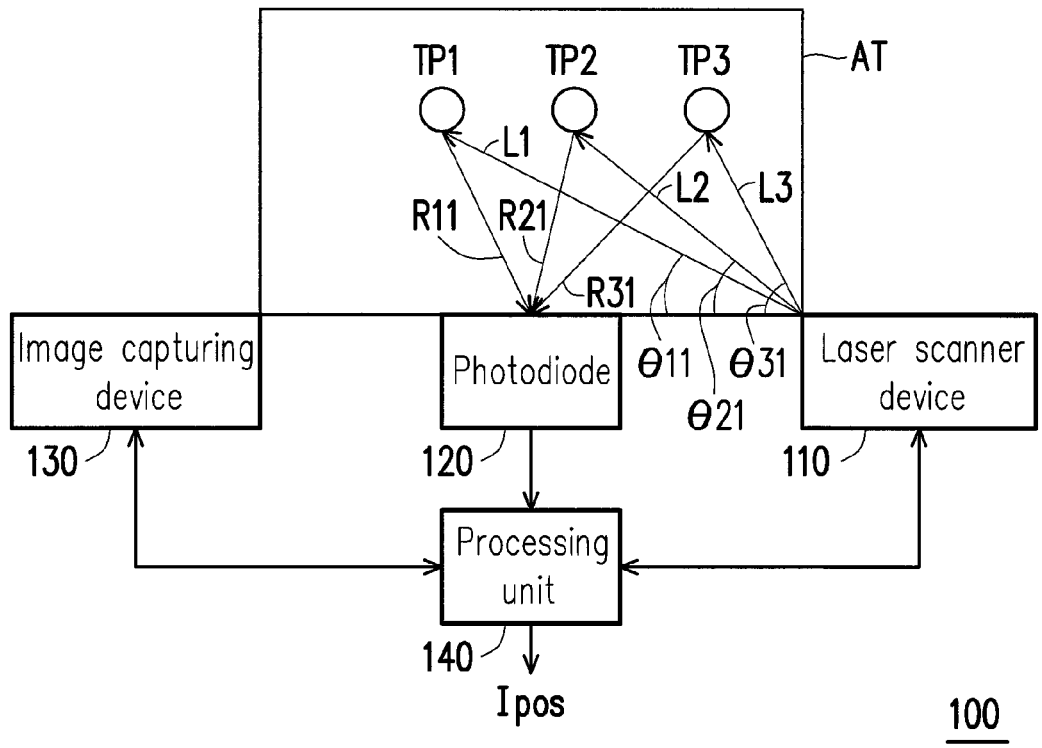
FIG. 2 is a schematic diagram illustrating a scanning operation performed in a first period when the touch module depicted in FIG. 1 has multiple touch points according to an embodiment of the invention.

With reference to FIG. 1 and FIG. 2, in the embodiment, the touch region AT is assumed to have multiple touch points (e.g., 3 touch points TP1, TP2, and TP3), and the same or similar components in FIG. 1 and FIG. 2 share the same or similar reference numbers.

In the first period, the processing unit 140 may control the laser scanner device 110 to sequentially provide the laser beam L at angles from 0 degree to 90 degrees, i.e., the touch region AT is scanned at least once; alternatively, the processing unit 140 may control the laser scanner device 110 to sequentially provide the laser beam L at angles from 0 degree to 90 degrees and from 90 degrees to 0 degree, i.e., the touch region AT is scanned back and forth at least once. In the embodiment, when the laser beams L1, L2, and L3 sequentially provided by the laser scanner device 110 are respectively emitted at angles θ11, θ21, and θ31, the photodiode 120 respectively receives reflection beams R11, R21, and R31 corresponding to the touch points TP1, TP2, and TP3, and the processing unit 140 considers the angles θ11, θ21, and θ31 as the first angles respectively corresponding to the touch points TP1, TP2, and TP3.

With reference to FIG. 1, FIG. 2, and FIG. 3A to FIG. 3C, there are multiple touch points (e.g., 3 touch points) according to the embodiment, and it is also represented that the number of first angles (e.g., θ11, θ21, and θ31) is 3. Hence, the second period may be divided into a plurality of sub-periods, and the number of the sub-periods is equal to the number of the touch points. In the embodiment, the number of the sub-periods is 3, which should however not be construed as a limitation to the invention.

Figure 3A:
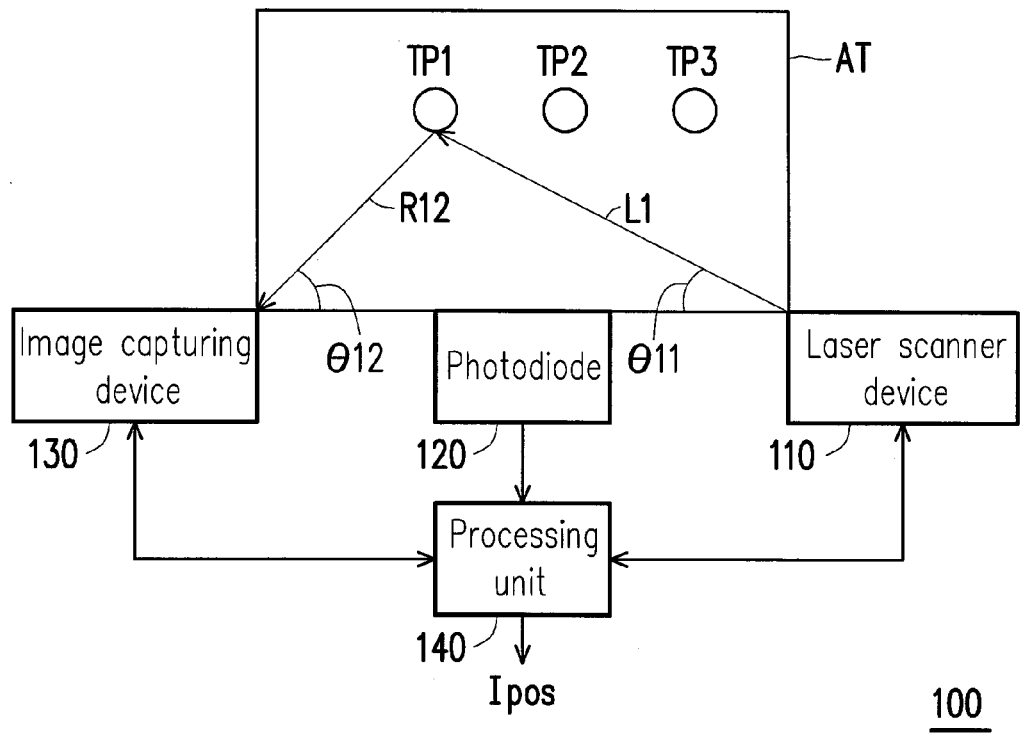
FIG. 3A to FIG. 3C are schematic diagrams illustrating a scanning operation performed in a second period when the touch module depicted in FIG. 1 has multiple touch points according to an embodiment of the invention.

During the first sub-period of the second period, as shown in FIG. 3A, the processing unit 140 controls the laser scanner device 110 to provide the first touch point TP1 in the touch region AT with the laser beam L1 at the first angle θ11, so as to irradiate an object located at the first touch point TP1 and thereby generate reflection. Besides, the processing unit 140 also controls the image capturing device 130 to capture a corresponding image having the reflection beam R12 from the first touch point TP1 in the touch region AT. Since the brightness of the object located at the first touch point TP1 is increased, the processing unit 140 may determine the second angle θ12 corresponding to the first touch point TP1 through the reflection beam R12 in the image captured by the image capturing device 130; that is, the first angle θ11 corresponds to the second angle θ12. At this time, the processing unit 140 may, based on the first angle θ11 and the second angle θ12, calculate the coordinate of the first touch point TP1 through triangulation and provide the location information Ipos corresponding to the first touch point TP1.

Figure 3B:
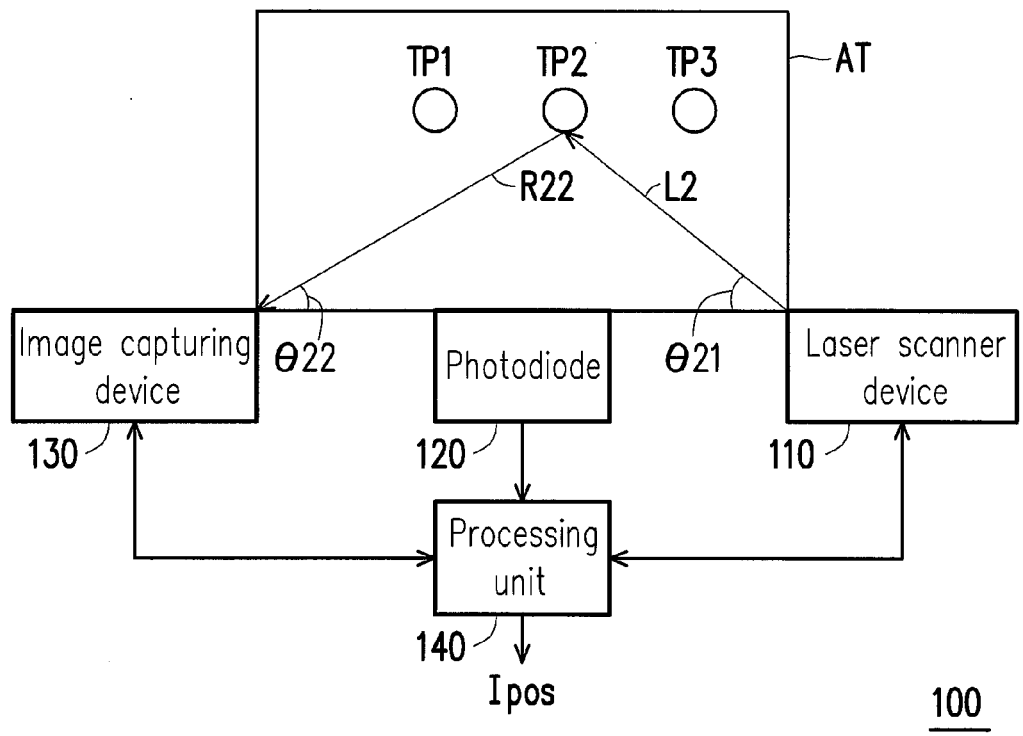

Similarly, during the second sub-period of the second period, as shown in FIG. 3B, the processing unit 140 controls the laser scanner device 110 to provide the second touch point TP2 in the touch region AT with the laser beam L2 at the first angle θ21, so as to irradiate an object located at the second touch point TP2 and thereby generate reflection. Besides, the processing unit 140 may determine the second angle θ22 corresponding to the second touch point TP2 through the reflection beam R22 in the image captured by the image capturing device 130; that is, the first angle θ21 corresponds to the second angle θ22. At this time, the processing unit 140 may, based on the first angle θ21 and the second angle θ22, calculate the coordinate of the second touch point TP2 through triangulation and provide the location information Ipos corresponding to the second touch point TP2.

Figure 3C:
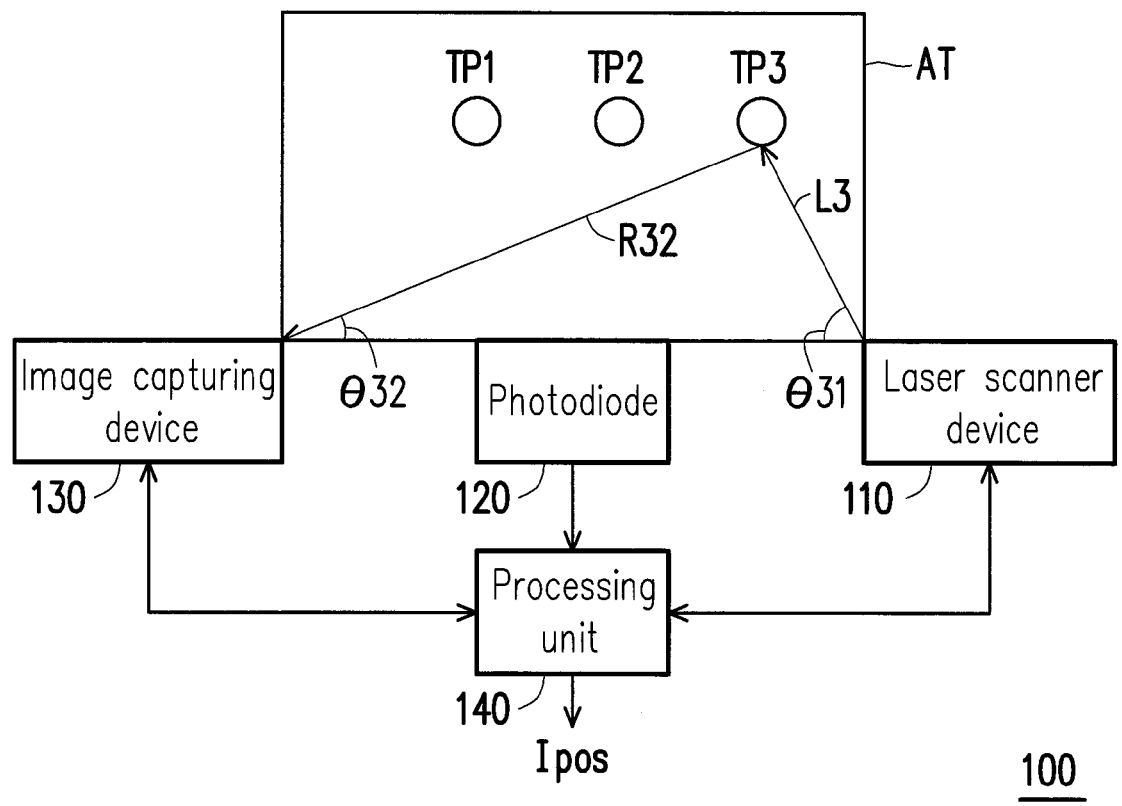

During the third sub-period of the second period, as shown in FIG. 3C, the processing unit 140 controls the laser scanner device 110 to provide the third touch point TP3 in the touch region AT with the laser beam L3 at the first angle θ31, so as to irradiate an object located at the third touch point TP3 and thereby generate reflection. Besides, the processing unit 140 may determine the second angle θ32 corresponding to the third touch point TP3 through the reflection beam R32 in the image captured by the image capturing device 130; that is, the first angle θ31 corresponds to the second angle θ32. At this time, the processing unit 140 may, based on the first and second angles θ31 and θ32, calculate the coordinate of the third touch point TP3 through triangulation and provide the location information Ipos corresponding to the third touch point TP3. In light of the above, when the image capturing device 130 captures N images, there may be N touch points in the touch region AT. Here, N is a positive integer, and N is greater than or equal to 2.

In the embodiment, the order of the sub-periods in the second period may be determined by people skilled in the art; that is, the first angles corresponding to the laser beams L1, L2, and L3 provided by the laser scanner device 110 may be in the order of θ11, θ21, and θ31 or on the order of θ31, θ21, and θ11, which should however not be construed as a limitation to the invention.

With reference to FIG. 1, FIG. 2, FIG. 3A to FIG. 3C, and FIG. 4A and FIG. 4B, in the embodiment, the touch region AT is assumed to have multiple touch points (e.g., 3 touch points TP1, TP2, and TP3). The operation of the touch module 100 in the first period may be referred to the descriptions in the embodiment shown in FIG. 2 and thus will not be further described herein, and the same or similar components in these drawings share the same or similar reference numbers.

Since there are multiple touch points (e.g., 3 touch points) according to the embodiment, that is, the first angles of the touch points TP1, TP2, and TP3 are respectively θ11, θ21, and θ31. Hence, the second period may also be divided into a plurality of sub-periods. However, the irradiation time of each touch point in the sub-periods of the second period is different from one another because a coding method similar to binary coding is applied in the embodiment; wherein the number of the images captured in the sub-periods is N and therefore the number of the touch points may be $2^N-1$ by the method in the embodiment, N is a positive integer, and N is greater than or equal to 2. Namely, the number of the captured images is 2 by the method in the embodiment, and it is obtained that the number of the touch points is 3.

Figure 4A:
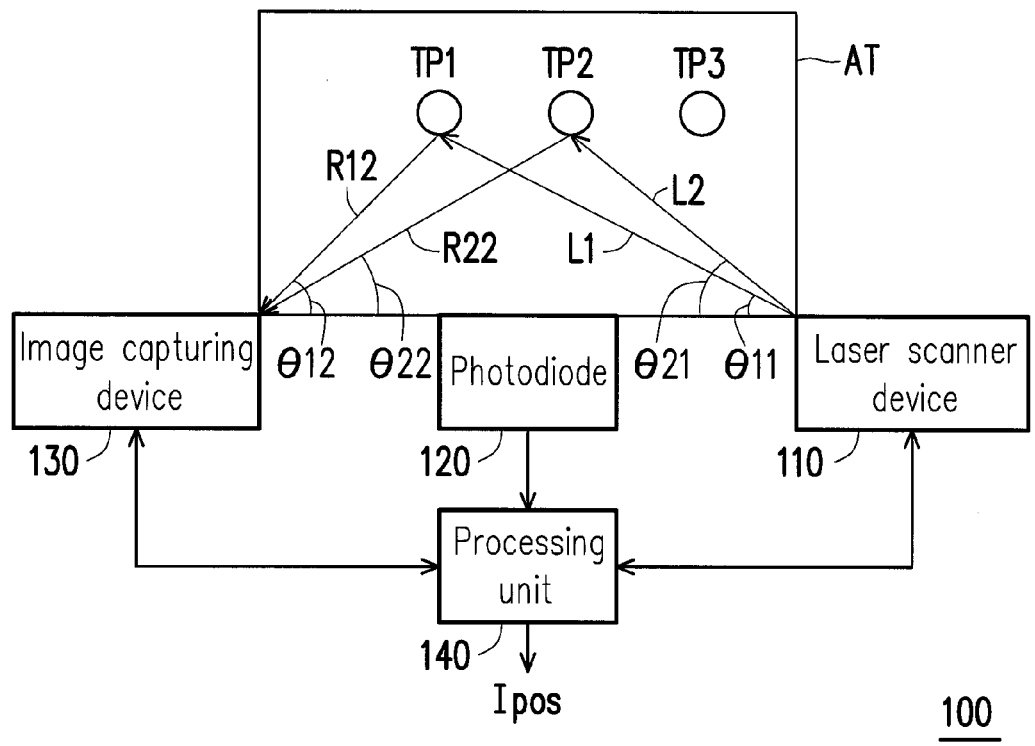
FIG. 4A and FIG. 4B are schematic diagrams illustrating a scanning operation performed in a second period when the touch module depicted in FIG. 1 has multiple touch points according to another embodiment of the invention.

During the first sub-period of the second period, as shown in FIG. 4A, the processing unit 140 controls the laser scanner device 110 to provide the touch region AT with laser beams correspondingly at the partial first angles. In the embodiment, the laser beams L1 and L2 respectively at the first angles θ11 and θ21 are provided, so as to irradiate objects respectively located at the touch points TP1 and TP2. Besides, the processing unit 140 may determine the second angles θ12 and θ22 respectively corresponding to the first angles θ11 and θ21 through the reflection beams R12 and R22 captured by the image capturing device 130.

Figure 4B:
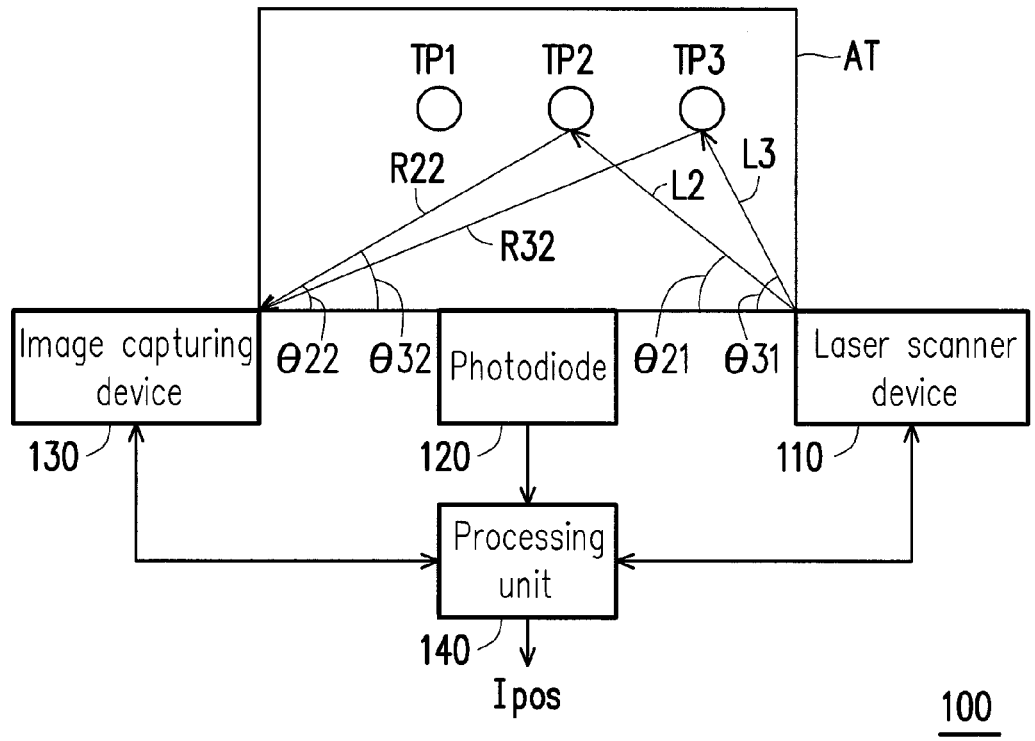
Figure 5A:
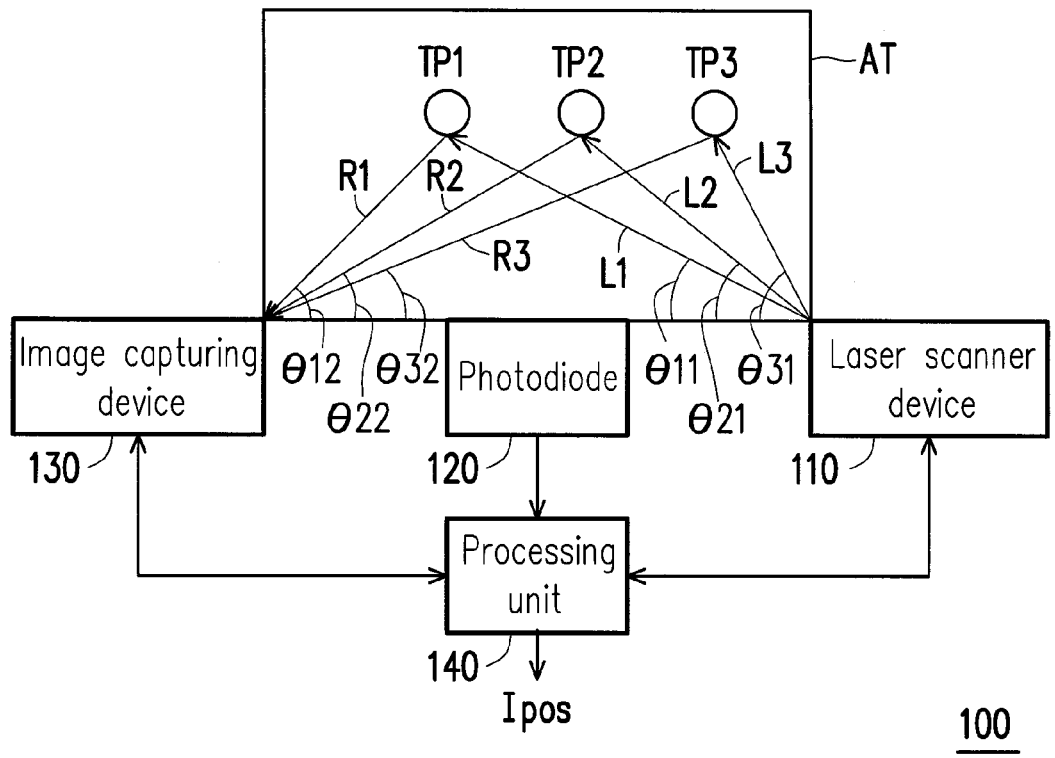
FIG. 5A and FIG. 5B are schematic diagrams illustrating a scanning operation performed in a second period when the touch module depicted in FIG. 1 has multiple touch points according to yet another embodiment of the invention.
Figure 5B:
Figure 5B:
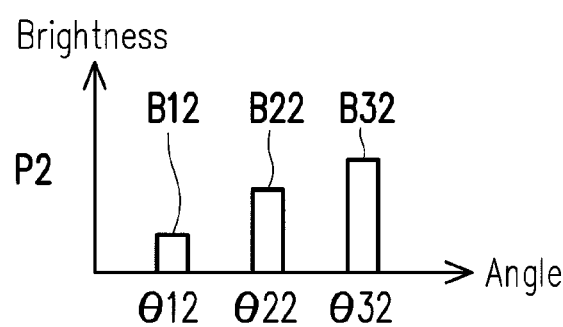

During the second sub-period of the second period, as shown in FIG. 4B, the processing unit 140 provides the touch region AT with the laser beams L2 and L3 respectively at the first angles θ21 and θ31, so as to irradiate objects respectively located at the touch points TP2 and TP3. Besides, the processing unit 140 may determine the second angles θ22 and θ32 respectively corresponding to the first angles θ21 and θ31 through the reflection beams R22 and R32 captured by the image capturing device 130.

Afterwards, the processing unit 140 may determine the second angles (e.g., θ12 to θ32) respectively corresponding to the first angles (e.g., θ11 to θ31) according to the corresponding state between the first angles θ11 to θ31 and the second angles θ12 to θ32 in the first and second sub-periods. Based on the corresponding state between the first angles θ11 to θ31 and the second angles θ12 to θ32 in the above two sub-periods, it may be determined that the first angle θ11 corresponds to the second angle θ12, the first angle θ21 corresponds to the second angle θ22, and the first angle θ31 corresponds to the second angle θ32. The processing unit 140 is then able to calculate and provide the location information Ipos corresponding to the touch point TP1 according to the first angle θ11 and the second angle θ12, calculate and provide the location information Ipos corresponding to the touch point TP2 according to the first angle θ21 and the second angle θ22, and calculate and provide the location information Ipos corresponding to the touch point TP3 according to the first angle θ31 and the second angle θ32.

In the first sub-period (shown in FIG. 4A), the image capturing device 130 may merely obtain that the second angles θ12 and θ22 correspond to the first angles θ11 and θ21 and may not obtain that the touch point corresponding to the first angle θ11 and the corresponding second angle θ12 is the touch point TP1 and the touch point corresponding to the first angle θ21 and the corresponding second angle θ22 is the touch point TP2; similarly, in the second sub-period, it may not be determined that the touch point corresponding to the first angle θ21 and the corresponding second angle θ22 and the touch point corresponding to the first angle θ31 and the corresponding second angle θ32 are respectively the touch points TP2 and TP3.

Hence, according to the above mentions, the processing unit 140 may determine the second angle (e.g., θ12, θ22, or θ32) corresponding to the first angle (e.g., θ11, θ21, or θ31) according to the partial first angles (e.g., θ11, θ21, and θ31) corresponding to each of the sub-periods and the second angles (e.g., θ12, θ22, and θ32) captured by the image capturing device 130 in each of the sub-periods, so as to calculate the location information Ipos of each touch point (e.g., TP1 to TP3). Since the corresponding second angle θ22 in the first sub-period and the corresponding second angle θ22 in the second sub-period are repeated, it may be determined that the touch point TP2 corresponds to the second angle θ22 in the first sub-period, and therefore the touch point TP1 corresponds to the second angle θ21. Similarly, since the touch point TP2 corresponds to the second angle θ22 in the second sub-period, the touch point TP3 corresponds to the second angle θ32.

With reference to FIG. 1, FIG. 2, FIG. 3A to FIG. 3C, and FIG. 5A and FIG. 5B, in the embodiment, the touch region AT is assumed to have 3 touch points TP1, TP2, and TP3. The operation of the touch module 100 in the first period may be referred to the descriptions in the embodiment shown in FIG. 2 and thus will not be further described herein, and the same or similar components in these drawings share the same or similar reference numbers.

Since there are multiple touch points according to the embodiment, i.e., the number of the first angles (e.g., θ11, θ21, and θ31) is greater than or equal to 2, the second period may also be divided into a plurality of sub-periods (e.g., P1 and P2). However, in the embodiment, the varied level of the irradiation brightness of these touch points (e.g., TP1 to TP3) in the sub-periods of the second period may be different, and the number of the sub-periods is 2.

During the first sub-period P1 of the second period, the processing unit 140 controls the laser scanner device 110 to sequentially provide the touch region AT with the laser beam L having the same irradiation brightness correspondingly at the first angles θ11, θ21, and θ31, so as to sequentially irradiate objects respectively located at the touch points TP1, TP2, and TP3. Besides, the processing unit 140 may determine that the irradiation brightness values respectively corresponding to the second angles θ12, θ22, and θ32 are B11, B21, and B31 through the image having the reflected laser beam captured by the image capturing device 130. Here, the difference of the brightness value of the reflected laser beam may be due to the coarseness level of a user's skin texture, the reflection portion being the difference between nails and skin, the color of the skin, and so on.

During the second sub-period P2 of the second period, the processing unit 140 controls the laser scanner device 110 to sequentially provide the touch region AT with the laser beams L1, L2, and L3 having different irradiation brightness correspondingly at the first angles θ11, θ21, and θ31, so as to sequentially irradiate objects respectively located at the touch points TP1, TP2, and TP3. Besides, the processing unit 140 may determine that the brightness values respectively corresponding to the second angles θ12, θ22, and θ32 are B12, B22, and B32 according to the captured images through the images of the reflection beams R1, R2, and R3 resulted from the touch points TP1, TP2, and TP3 respectively reflecting the laser beams L1, L2, and L3 captured by the image capturing device 130.

The processing unit 140 may then determine the second angle (e.g., θ12, θ22, or θ32) corresponding to the first angle (e.g., θ11, θ21, or θ31) according to the variations in the irradiation brightness corresponding to the first angles θ11, θ21, and θ31 in the first sub-period P1 and the second sub-period P2 and the variations in the irradiation brightness corresponding to the second angles θ12, θ22, and θ32 captured by the image capturing device 130 in the first sub-period P1 and the second sub-period P2. For instance, from the first sub-period P1 to the second sub-period P2, the irradiation of the laser beam L1 corresponding to the first angle θ11 is changed from 1 to 0.4, the irradiation of the laser beam L2 corresponding to the first angle θ21 is changed from 1 to 0.8, and the irradiation of the laser beam L3 corresponding to the first angle θ31 remains 1. Besides, if the brightness value B12 in the second sub-period P2 divided by the brightness value B11 in the first sub-period P1 is about 0.4, the brightness value B22 in the second sub-period P2 divided by the brightness value B21 in the first sub-period P1 is about 0.8, and the brightness value B32 in the second sub-period P2 divided by the brightness value B31 in the first sub-period P1 is about 1, then the second angle θ12 corresponds to the first angle θ11, the second angle θ22 corresponds to the first angle θ21, and the second angle θ32 corresponds to the first angle θ31. That is, the processing unit 140 determines that the second angle corresponds to the first angle according to the variations in the irradiation brightness values in the first sub-period and in the second sub-period being the same.

The processing unit 140 is then able to calculate and provide the location information Ipos corresponding to the touch point TP1 according to the first angle θ11 and the second angle θ12, calculate and provide the location information Ipos corresponding to the touch point TP2 according to the first angle θ21 and the second angle θ22, and calculate and provide the location information Ipos corresponding to the touch point TP3 according to the first angle θ31 and the second angle θ32. According to the embodiment, N being greater than or equal to 2 may be implemented by capturing only 2 images.

In an embodiment of the invention, the irradiation brightness of the laser beams L1, L2, and L3 respectively corresponding to the first angles θ11, θ21, and θ31 may be adjusted by the number of irradiation times. That is, the first angles (e.g., θ11, θ21, and θ31) in the first sub-period P1 correspond to the same number of irradiation times of the laser beam L, and the first angles (e.g., θ11, θ21, and θ31) in the second sub-period P2 correspond to different irradiation times of the laser beam L. Alternatively, the irradiation brightness of the laser beam L corresponding to the first angles θ11, θ21, and θ31 may be adjusted by the irradiation power. That is, the first angles (e.g., θ11, θ21, and θ31) in the first sub-period P1 correspond to the same irradiation power of the laser beam L, and the first angles (e.g., θ11, θ21, and θ31) in the second sub-period P2 correspond to different irradiation power of the laser beam L.

Figure 6A:
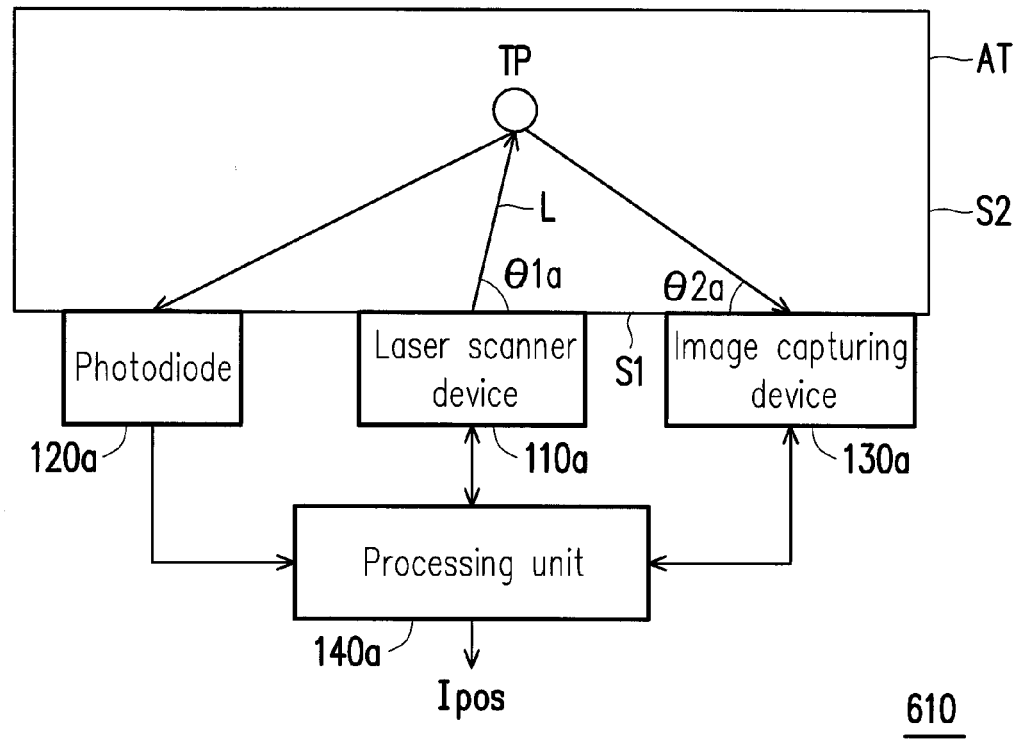
FIG. 6A is a systematic diagram schematically illustrating a touch module according to another embodiment of the invention.

With reference to FIG. 1 and FIG. 6A, the touch module 610 is substantially the same as the touch module 100, while the difference is; the laser scanner device 110a, the photodiode 120a, and the image capturing device 130a in FIG. 6A are located on the side S1 of the touch region AT, and that the laser scanner device 110a is located between the photodiode 120a and the image capturing device 130a. Here, the same or similar components in FIG. 1 and FIG. 6A may share the same or similar reference numbers, and the laser scanner device 110a is capable of providing an 180-degree laser beam L, for instance.

In the embodiment, the operational manner of the touch module 610 is substantially the same as that of the touch module 100. That is, the laser scanner device 110a sequentially provides the touch region AT with the laser beam L at a plurality of angles in a first period. It is determined that the first angle (e.g., θ1a) corresponding to the touch point (e.g., TP) through the first reflection beam R1 generated by the touch point (e.g., TP) in the touch region AT reflecting the laser beam L. In a second period, the image capturing device 130a then captures a corresponding image having a second reflection beam R2 in the touch region AT, so as to capture the second angle (e.g., θ2a) corresponding to the touch point (e.g., TP) in the touch region AT. According to the first angle (e.g., θ1a) and the second angle (e.g., θ2a) corresponding to the touch point (e.g., TP), the processing unit 140a calculates location information Ipos of the touch point (e.g., TP).

In the embodiment, the laser scanner device 110a, the photodiode 120a, and the image capturing device 130a are located on the same side, which should however not be construed as a limitation to the invention. That is, the laser scanner device 110a and the image capturing device 130a may be respectively located on different sides of the touch region AT, and the laser scanner device 110a and the photodiode 120a may be located on different sides of the touch region AT.

Figure 6B:
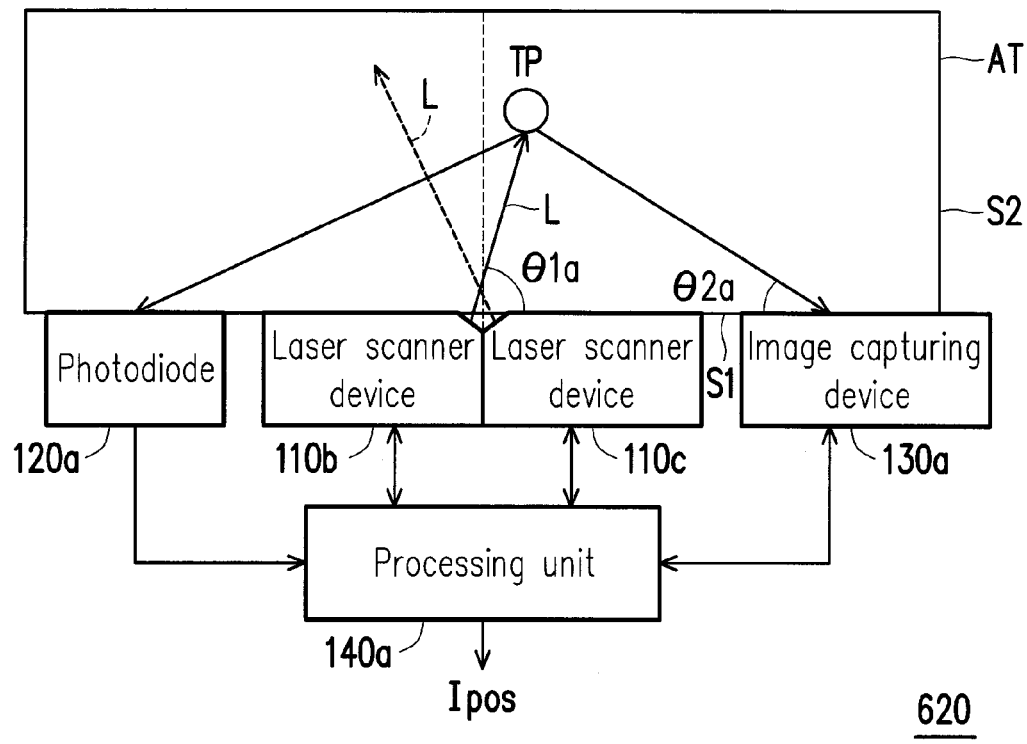
FIG. 6B is a systematic diagram schematically illustrating a touch module according to yet another embodiment of the invention.

With reference to FIG. 6A and FIG. 6B, the touch module 620 is substantially the same as the touch module 610, the difference is: the laser scanner device in FIG. 6B is divided into two laser scanner devices 110b and 110c. Here, the same or similar components in FIG. 6A and FIG. 6B may share the same or similar reference numbers, and each of the laser scanner devices 110b and 110c may provide a 90-degree laser beam L, for instance.

In the embodiment, the laser scanner device 110b sequentially provides the right half (e.g., the right side of the dotted line in FIG. 6B) of the touch region AT with the laser beam L at a plurality of angles in a first period, and the laser scanner device 110c sequentially provides the left half (e.g., the left side of the dotted line in FIG. 6B) of the touch region AT with the laser beam L at a plurality of angles in the first period. Here, the laser scanner devices 110b and 110c alternately provide the laser beam L. For instance, the laser scanner devices 110b and 110c may provide the laser beam L in turn; alternatively, after one of the laser scanner devices 110b and 110c provides the laser beam L at plural angles, the other of the laser scanner devices 110b and 110c then provides the laser beam L at plural angles.

Figure 7:
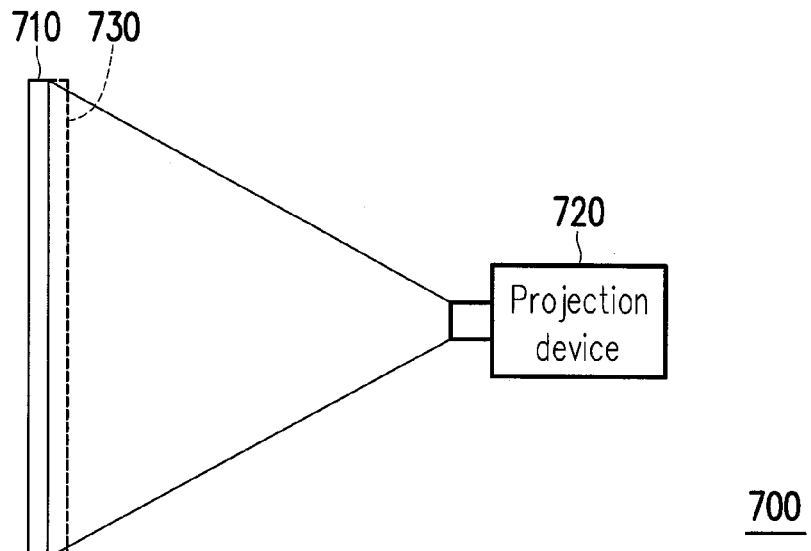
FIG. 7 is a schematic diagram illustrating a projection system according to an embodiment of the invention.

With reference to FIG. 7, in the embodiment, the projection system 700 includes a projection screen 710, a projection device 720, and a projection module 730. Here, the projection screen 710 may be a white wall, a curtain made of a material with reflectivity or a transparent material coated with a reflective material, and so on, which should not be construed as a limitation to the invention. The projection device 720 is configured to project an image to the projection screen 710, and the touch module 730 is located on the projection screen 710 to project the surface of the image. Here, the projection module 730 may be referred to as the touch module 100 shown in FIG. 1, the touch module 610 shown in FIG. 6A, or the touch module 620 shown in FIG. 6B. The location information Ipos of the touch point (e.g., TP) generated by the touch module 100 (as shown in FIG. 1) is transmitted to and processed by a processor 740. The processed signal may be provided to the projection device 720 to project the corresponding image. Alternatively, the processor 740 and the projection device 720 may be integrally formed, and the location information Ipos is directly transmitted to and processed by the projection device 720 for projecting the corresponding image.

Figure 8:
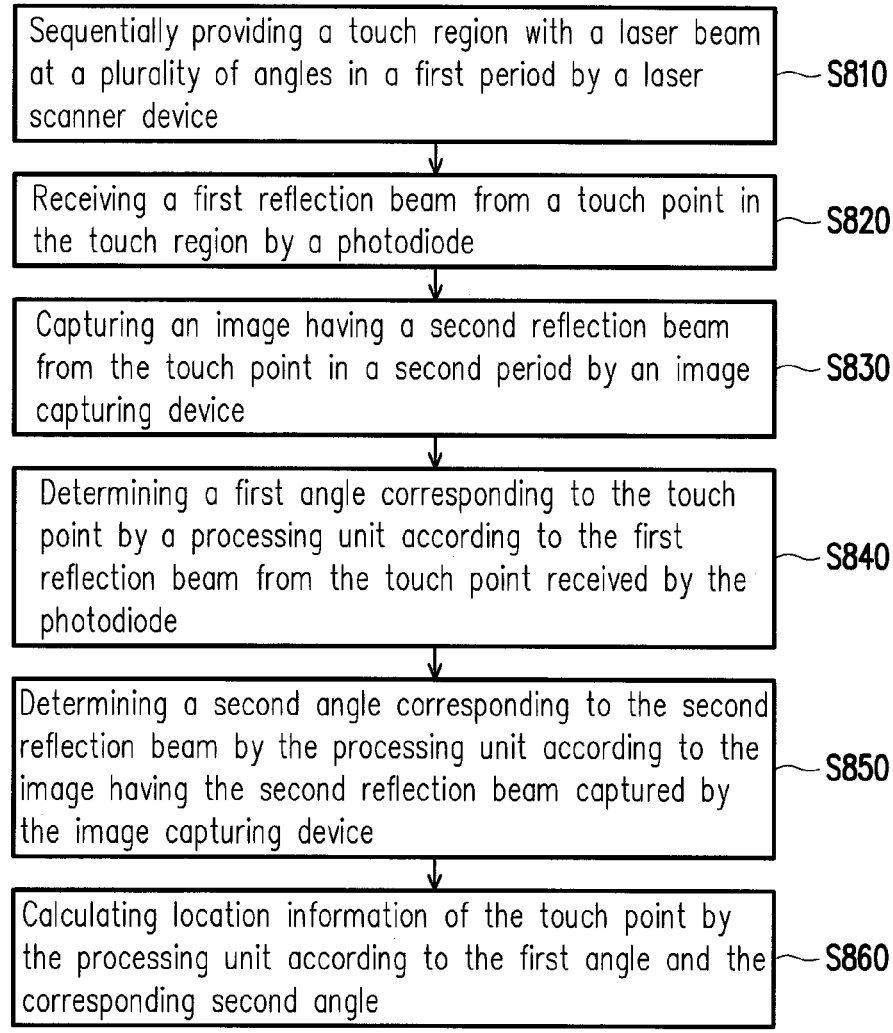
FIG. 8 is a flowchart illustrating a touch method of a touch module according to an embodiment of the invention.

With reference to FIG. 8, in the embodiment, the touch method includes following step. A touch region is sequentially provided with a laser beam at a plurality of angles in a first period by a laser scanner device (step S810); a first reflection beam from a touch point in the touch region is received by a photodiode (step S820). An image having a second reflection beam from the touch point is then captured in a second period by an image capturing device (step S830). A first angle corresponding to the touch point is determined by a processing unit according to the first reflection beam from the touch point received by the photodiode (step S840); a second angle corresponding to the second reflection beam is determined by the processing unit according to the image having the second reflection beam captured by the image capturing device (step S850); location information of the touch point is calculated by the processing unit according to the first angle and the corresponding second angle (step S860).

In the steps, if the number of the first angle is 1, the touch region is sequentially provided with the laser beam corresponding to the first angle by the laser scanner device in the second period. At this time, the image capturing device captures the image having the reflected laser beam in the second period, and the location information of the touch point is calculated according to the first angle and the corresponding second angle.

On the other hand, when the number of the first angles is greater than or equal to 2, the touch region is provided with the laser beam corresponding to one of a plurality of the first angles by the laser scanner device respectively in a plurality of sub-periods of the second period. Through the image capturing device, the second angles corresponding to the captured images having the reflected laser beams in each sub-period correspond to the first angles in each sub-period. The location information of the touch points is then calculated according to the first angles corresponding to the each sub-period and the second angles corresponding to the captured images having the reflected laser beams in the each sub-period through the image capturing device.

Alternatively, when the number of the first angles is greater than or equal to 2, the touch region is provided with the laser beam corresponding to the partial first angles by the laser scanner device respectively in a plurality of sub-periods of the second period, and the corresponding second angle of each first angle is determined according to the partial first angles corresponding to each of the sub-periods and the second angles corresponding to the images having the reflected beams captured by the image capturing device in each of the sub-periods. According to each first angle and its corresponding second angle, the location information of each of the touch points is calculated, wherein the partial first angles corresponding to the sub-periods are partially repeated.

Furthermore, when the number of the first angles is greater than or equal to 2, the touch region is sequentially provided with the laser beam corresponding to the first angles and corresponding to the same irradiation brightness by the laser scanner device in a first sub-period of the second period, and the touch region is sequentially provided with the laser beam corresponding to the first angles and corresponding to different irradiation brightness by the laser scanner device in a second sub-period of the second period. The second angles corresponding to the first angles are then determined according to variations in the irradiation brightness corresponding to the second angles captured by the image capturing device in the first sub-period and the second sub-period. After that, according to each first angle and its corresponding second angle, the location information of each of the touch points is calculated.

The order of performing the steps in the touch method is merely exemplary and should not be construed as a limitation to the invention. The details of these steps may be referred to as those described in the embodiments shown in FIG. 1, FIG. 2, FIG. 3A, FIG. 3B, FIG. 3C, FIG. 4A, FIG. 4B, FIG. 5A, FIG. 5B, FIG. 6A, and FIG. 6B and thus will not be further explained hereinafter.

Moreover, the processing unit in the embodiment may be one or a combination of a central processing unit (CPU), a programmable general-purpose microprocessor, a specific-purpose microprocessor, a digital signal processor (DSP), an analog signal processor, a programmable controller, an application specific integrated circuits (ASIC), a programmable logic device (PLD), an image processor, a graphics processing unit (GPU), or any other similar device. In the other embodiment, the processing unit may be processing software, such as signal processing software, digital signal processing software (DSP software), analog signal processing software, image processing software, graphics processing software, audio processing software.

To sum up, in the embodiment of the invention, in the touch module, the projection system having the touch module, and the touch method of the touch module described above, the photodiode is employed to detect the first angles corresponding to the reflection beams of the touch points in the first period, and in the second period the irradiation states corresponding to the touch points by the laser beam from the laser scanner device are different. Thereby, the multi-touch function may be performed without increasing the hardware costs of the touch module. Moreover, when each of the touch points has different irradiation brightness in the second period, the speed of detecting the multiple touch points may be accelerated.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims. Furthermore, these claims may refer to use "first", "second", "third", etc. following with noun or element. Such terms should be understood as a nomenclature and should not be construed as giving the limitation on the number of the elements modified by such nomenclature unless specific number has been given.

What is claimed is:

1. A touch module comprising:
   a laser scanner device sequentially providing a touch region with a laser beam at a plurality of angles in a first period;
   a photodiode configured for receiving a first reflection beam from a touch point in the touch region, wherein the laser beam irradiates the touch point to result in reflection to generate the first reflection beam;
   an image capturing device capturing an image having a second reflection beam from the touch point in a second period, wherein the laser beam irradiates the touch point to result in reflection to generate the second reflection beam; and
   a processing unit electrically connected to the laser scanner device, the photodiode, and the image capturing device, the processing unit determining a first angle corresponding to the touch point according to the first reflection beam from the touch point received by the photodiode, determining a second angle corresponding to the second reflection beam according to the image having the second reflection beam captured by the image capturing device, and calculating location information of the touch point according to the first angle and the corresponding second angle.

2. The touch module as claimed in claim 1, wherein in the second period the laser scanner device provides the touch region with the laser beam corresponding to the first angle.

3. The touch module as claimed in claim 2, wherein when the touch region has a plurality of touch points, the laser scanner device provides the touch region with a plurality of laser beams corresponding to one of a plurality of first angles respectively in a plurality of sub-periods of the second period, and the processing unit calculates the location information of the touch points according to the first angles corresponding to the sub-periods and a plurality of second angles obtained by the image capturing device in the sub-periods.

4. The touch module as claimed in claim 2, wherein when the touch region has a plurality of touch points, the laser scanner device provides the touch region with the laser beam corresponding to a portion of a plurality of first angles respectively in a plurality of sub-periods of the second period, the processing unit determines a plurality of second angles corresponding to the first angles according to the portion of the first angles in the sub-periods and the second angles captured by the image capturing device in the sub-periods, so as to calculate the location information of the touch points, and the portion of the first angles corresponding to the sub-periods are partially repeated.

5. The touch module as claimed in claim 4, wherein the number of a plurality of the captured images captured in the sub-periods is N, the number of the touch points is $2^N-1$, N is a positive integer, and N is greater than or equal to 2.

6. The touch module as claimed in claim 2, wherein when the touch region has a plurality of touch points, the laser scanner device sequentially provides the touch region with the laser beam corresponding to a plurality of first angles and corresponding to the same irradiation brightness in a first sub-period of the second period and sequentially provides the touch region with the laser beam corresponding to the first angles and corresponding to different irradiation brightness in a second sub-period of the second period, and the processing unit determines the second angles corresponding to the first angles according to variations in the irradiation brightness corresponding to the first angles in the first sub-period and the second sub-period and variations in the irradiation brightness corresponding to the second angles obtained by the image capturing device in the first sub-period and the second sub-period, so as to calculate the location information of the touch points.

7. The touch module as claimed in claim 6, wherein the first angles in the first sub-period correspond to the same number of irradiation times of the laser beam, and the first angles in the second sub-period correspond to different irradiation times of the laser beam.

8. The touch module as claimed in claim 6, wherein the first angles in the first sub-period correspond to identical irradiation power of the laser beam, and the first angles in the second sub-period correspond to different irradiation power of the laser beam.

9. The touch module as claimed in claim 6, wherein the processing unit determines that the second angle corresponds to the first angle according to the variation in the irradiation brightness corresponding to the first angle being identical to the variation in the irradiation brightness corresponding to the second angles obtained by the image capturing device.

10. A projection system comprising:
a projection screen;
a projection device configured for projecting an image to the projection screen; and
a touch module located on the projection screen, the touch module comprising:
a laser scanner device sequentially providing a projection region on the projection screen with a laser beam at a plurality of angles in a first period;
a photodiode configured for receiving a first reflection beam from a touch point in the projection region, wherein the laser beam irradiates the touch point to result in reflection to generate the first reflection beam;
an image capturing device capturing an image having a second reflection beam from the touch point in a second period, wherein the laser beam irradiates the touch point to result in reflection to generate the second reflection beam; and
a processing unit electrically connected to the laser scanner device, the photodiode, and the image capturing device, the processing unit determining a first angle corresponding to the touch point according to the first reflection beam from the touch point received by the photodiode, determining a second angle corresponding to the second reflection beam according to the image having the second reflection beam captured by the image capturing device, and calculating location information of the touch point according to the first angle and the corresponding second angle.

11. The projection system as claimed in claim 10, wherein in the second period the laser scanner device sequentially provides the projection region with the laser beam corresponding to the first angle.

12. The projection system as claimed in claim 11, wherein when the touch region has a plurality of touch points, the laser scanner device provides the projection region with a plurality of laser beams corresponding to one of a plurality of first angles respectively in a plurality of sub-periods of the second period, and the processing unit calculates the location information of the touch points according to the first angles corresponding to the sub-periods and a plurality of second angles obtained by the image capturing device in the sub-periods.

13. The projection system as claimed in claim 11, wherein when the projection region has a plurality of touch points, the laser scanner device provides the projection region with the laser beam corresponding to a portion of a plurality of first angles respectively in a plurality of sub-periods of the second period, the processing unit determines a plurality of second angles corresponding to the first angles according to the portion of the first angles in the sub-periods and the second angles captured by the image capturing device in the sub-periods, so as to calculate the location information of the touch points, and the portion of the first angles corresponding to the sub-periods are partially repeated.

14. The projection system as claimed in claim 13, wherein the number of a plurality of the captured images captured in the sub-periods is N, the number of the touch points is $2^N-1$, N is a positive integer, and N is greater than or equal to 2.

15. The projection system as claimed in claim 11, wherein when the projection region has a plurality of touch points, the laser scanner device sequentially provides the projection region with the laser beam corresponding to a plurality of first angles and corresponding to the same irradiation brightness in a first sub-period of the second period and sequentially provides the projection region with the laser beam corresponding to the first angles and corresponding to different irradiation brightness in a second sub-period of the second period, and the processing unit determines the second angles corresponding to the first angles according to variations in the irradiation brightness corresponding to the first angles in the first sub-period and the second sub-period and variations in the irradiation brightness corresponding to the second angles obtained by the image capturing device in the first sub-period and the second sub-period, so as to calculate the location information of the touch points.

16. The projection system as claimed in claim 15, wherein the first angles in the first sub-period correspond to the same number of irradiation times of the laser beam, and the first angles in the second sub-period correspond to different irradiation times of the laser beam.

17. The projection system as claimed in claim 15, wherein the first angles in the first sub-period correspond to identical irradiation power of the laser beam, and the first angles in the second sub-period correspond to different irradiation power of the laser beam.

18. The projection system as claimed in claim 15, wherein the processing unit determines that the second angle corresponds to the first angle according to the variation in the irradiation brightness corresponding to the first angle being identical to the variation in the irradiation brightness corresponding to the second angles captured by the image capturing device.

19. A touch method of a touch module, comprising:
sequentially providing a touch region with a laser beam at a plurality of angles in a first period by a laser scanner device;
receiving a first reflection beam from a touch point in the touch region by a photodiode, wherein the laser beam irradiates the touch point to result in reflection to generate the first reflection beam;
capturing an image having a second reflection beam from the touch point in a second period by an image capturing device, wherein the laser beam irradiates the touch point to result in reflection to generate the second reflection beam; and
determining a first angle corresponding to the touch point by a processing unit according to the first reflection beam from the touch point received by the photodiode, determining a second angle corresponding to the second reflection beam by the processing unit according to the image having the second reflection beam captured by the image capturing device, and calculating location information of the touch point by the processing unit according to the first angle and the corresponding second angle.

20. The touch method as claimed in claim 19, further comprising:
in the second period, sequentially providing the touch region with the laser beam corresponding to the first angle by the laser scanner device.

21. The touch method as claimed in claim 20, further comprising:
when the touch region has a plurality of touch points, providing the touch region with the laser beam corresponding to one of a plurality of first angles by the laser scanner device respectively in a plurality of sub-periods of the second period; and
calculating the location information of the touch points according to the first angles corresponding to the sub-periods and a plurality of second angles obtained by the image capturing device in the sub-periods.

22. The touch method as claimed in claim 20, further comprising:
when the touch region has a plurality of touch points, providing the touch region with the laser beam corresponding to a portion of a plurality of first angles by the laser scanner device respectively in a plurality of sub-periods of the second period; and
determining a plurality of second angles corresponding to the first angles according to the portion of the first angles in the sub-periods and the second angles captured by the image capturing device in the sub-periods, so as to calculate the location information of the touch points, wherein the portion of the first angles corresponding to the sub-periods are partially repeated.

23. The touch method as claimed in claim 22, wherein the number of a plurality of the captured images captured in the sub-periods is N, the number of the touch points is $2^N-1$, N is a positive integer, and N is greater than or equal to 2.

24. The touch method as claimed in claim 20, further comprising:
when the touch region has a plurality of touch points, sequentially providing the touch region with the laser beam corresponding to a plurality of first angles and corresponding to the same irradiation brightness by the laser scanner device in a first sub-period of the second period;
sequentially providing the touch region with the laser beam corresponding to the first angles and corresponding to different irradiation brightness by the laser scanner device in a second sub-period of the second period; and
determining the second angles corresponding to the first angles according to variations in the irradiation brightness corresponding to the first angles in the first sub-period and the second sub-period and variations in the irradiation brightness corresponding to the second angles obtained by the image capturing device in the first sub-period and the second sub-period, so as to calculate the location information of the touch points.

25. The touch method as claimed in claim 24, wherein the first angles in the first sub-period correspond to the same number of irradiation times of the laser beam, and the first angles in the second sub-period correspond to different irradiation times of the laser beam.

26. The touch method as claimed in claim 24, wherein the first angles in the first sub-period correspond to identical irradiation power of the laser beam, and the first angles in the second sub-period correspond to different irradiation power of the laser beam.

27. The touch method as claimed in claim 24, wherein the step of determining the second angles corresponding to the first angles comprises:
determining that the second angle corresponds to the first angle according to the variation in the irradiation brightness corresponding to the first angle being identical to the variation in the irradiation brightness corresponding to the second angles obtained by the image capturing device.

28. The touch method as claimed in claim 20, further comprising:
when the touch region has the touch point, providing the touch region with the laser beam corresponding to the first angle by the laser scanner device in the second period; and
calculating the location information of the touch point according to the first angle and the second angle obtained by the image capturing device in the second period.

* * * * *